United States Patent
Tsai et al.

(10) Patent No.: US 9,413,658 B2
(45) Date of Patent: Aug. 9, 2016

(54) SYSTEM FOR CONVERSATIONAL LINK AGGREGATION RESOLUTION IN A NETWORK SWITCH

(71) Applicants: Chiajen Tsai, Cupertino, CA (US); Yibin Yang, San Jose, CA (US); Rajagopalan Janakiraman, Cupertino, CA (US)

(72) Inventors: Chiajen Tsai, Cupertino, CA (US); Yibin Yang, San Jose, CA (US); Rajagopalan Janakiraman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 498 days.

(21) Appl. No.: 13/839,476

(22) Filed: Mar. 15, 2013

(65) Prior Publication Data

US 2014/0269695 A1  Sep. 18, 2014

(51) Int. Cl.
*H04L 12/741* (2013.01)
*H04L 12/709* (2013.01)
*H04L 12/939* (2013.01)

(52) U.S. Cl.
CPC ............ *H04L 45/745* (2013.01); *H04L 45/245* (2013.01); *H04L 49/55* (2013.01); *Y02B 60/33* (2013.01)

(58) Field of Classification Search
CPC ....... H04L 45/245; H04L 49/55; H04L 60/33; H04L 45/745

USPC .......................................... 370/216, 235, 389
See application file for complete search history.

(56) References Cited

U.S. PATENT DOCUMENTS

| | | | |
|---|---|---|---|
| 2008/0285555 A1 | 11/2008 | Ogasahara | |
| 2009/0225752 A1* | 9/2009 | Mitsumori | H04L 45/245 370/390 |
| 2011/0228767 A1 | 9/2011 | Singla et al. | |
| 2013/0028072 A1* | 1/2013 | Addanki | 370/218 |
| 2013/0258835 A1* | 10/2013 | Colven | H04L 12/4641 370/216 |

OTHER PUBLICATIONS

International Search Report dated Jul. 16, 2014 issued in connection with PCT/US2014/027265.

* cited by examiner

*Primary Examiner* — Jae Y Lee
*Assistant Examiner* — Jean F Voltaire
(74) *Attorney, Agent, or Firm* — Parker Ibrahim & Berg LLC; James M. Behmke; Stephen D. LeBarron

(57) ABSTRACT

Some implementations provide a method that includes: (i) receiving a list of logic link aggregations (LAGs) within a computer network, the list identifying a single physical egress port associated with each LAG; (ii) receiving a data unit; (iii) identifying that the data unit is addressed to a remote LAG included in the list of logic link aggregations; (iv) establishing a connection with the remote LAG; (v) downloading a detailed data describing the remote LAG from a control plane, the detailed data including a list of multiple available physical egress ports associated with the remote LAG, and; (vi) upon downloading the detailed data, incorporating the detailed data into the list of LAGs in association with an entry identifying the remote LAG.

20 Claims, 5 Drawing Sheets

SYSTEM FOR CONVERSATIONAL LINK AGGREGATION RESOLUTION IN A NETWORK SWITCH

TECHNICAL FIELD

The following disclosure relates generally to resolving links in a link aggregation scheme.

BACKGROUND

Link aggregation schemes (e.g., EtherChannel) provide a resilient mechanism for fault tolerance, load balancing and scalable bandwidth by grouping a set of physical network interfaces into a logic link aggregation (LAG). Traffic on the logic link is evenly distributed in steady state and dynamically adjusted in response to system events to avoid traffic polarization and black-holing, which would otherwise eliminate the primary benefits of link aggregation.

While dynamic load distribution is essential to cope with link failure and operational changes, the corresponding hardware reprogramming imposes a major challenge on large scale campus and datacenter switch design. As the number of ports in the switch system increases, both the computational load and the frequency of hardware reprogramming grow exponentially, and hence adversely affect the reliability and system responsiveness of link aggregation schemes.

DESCRIPTION OF EXAMPLE IMPLEMENTATIONS

Overview

Figure 1:
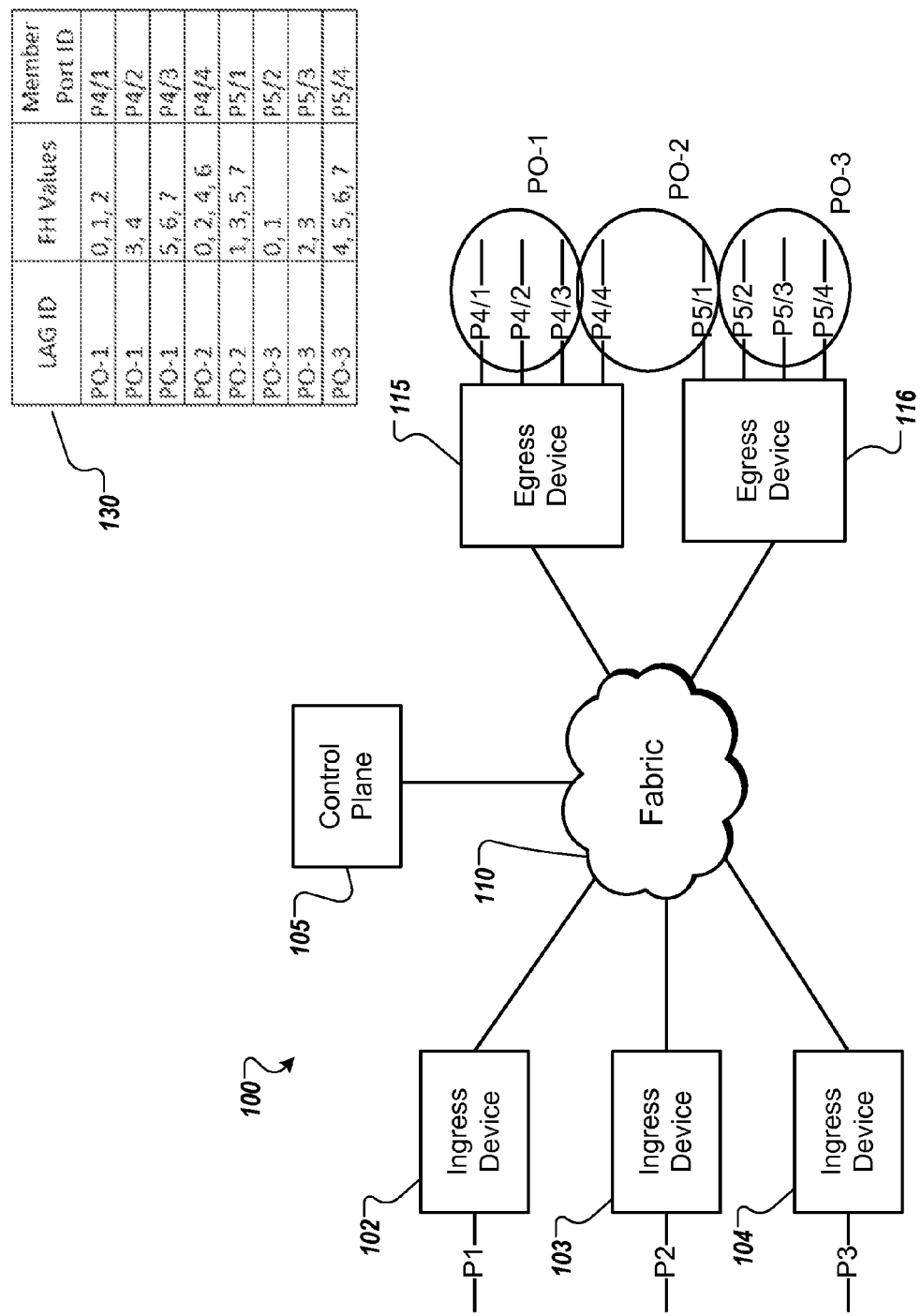
FIG. 1 illustrates a block diagram of an example of a network switch system employing link aggregation.

Some implementations provide a method that includes: (i) receiving a list of logic link aggregations (LAGs) within a computer network, the list identifying a single physical egress port associated with each LAG; (ii) receiving a data unit; (iii) identifying that the data unit is addressed to a remote LAG included in the list of logic link aggregations; (iv) establishing a connection with the remote LAG; (v) downloading a detailed data describing the remote LAG from a control plane, the detailed data including a list of multiple available physical egress ports associated with the remote LAG, and; (vi) upon downloading the detailed data, incorporating the detailed data into the list of LAGs in association with an entry identifying the remote LAG.

Detailed Description of Example Embodiments

A network switch system may include multiple devices interconnected by a logical fabric. Each of the devices included in the network switch system may include one or more physical ports, such as Ethernet links. However, each of the physical ports included in a device may generally be limited to a given bandwidth (e.g., 10 Mbit/s, 100 Mbit/s, or 1000 Mbit/s). To increase the bandwidth of a network communication channel, a network switch system may logically aggregate physical ports on one or more of the devices included in the network switch system. In other words, a network switch system may assign multiple physical network links to a single communication channel, thereby providing a communication channel with a greater available bandwidth than a single physical network link could provide. When implemented by a network switch system, link aggregation can be transparent to applications communicating via an established communication channel.

A device within a network switch system that receives a given data unit (e.g., a packet) may be referred to as an ingress device and a device that sends the given data unit to its next destination may be referred to as an egress device. Any device within a network switch system may be both an ingress device and an egress device, depending on whether the device is receiving a data unit into the network switch system or sending the data unit out of the network switch system. When an ingress device receives a given data unit through one of its ports, the ingress device may analyze the data unit to determine its recipient. However, when the egress devices within the network switch system utilize link aggregation, a given recipient may be associated with multiple physical ports included in one or more egress devices. Therefore, the ingress device must be able to resolve which of the multiple physical ports to which the data unit should be sent, a process known as link aggregation resolution.

The following description will describe systems and processes of link aggregation resolution from the perspective of the EtherChannel link aggregation scheme. However, the described systems and processes are also applicable to other link aggregation schemes (e.g., IEEE 802.3ad, IEEE 802.1AX, multi-link trunking, or bonding driver).

FIG. 1 illustrates a block diagram of an example of a network switch system employing link aggregation. The network switch system 100 includes ingress devices 102, 103, and 104, control plane 105, fabric 110, and egress devices 115 and 116. In a modular switch design (e.g., Cisco Cat6500), the devices included in the network switch system 100 may be implemented as, for example, line cards. In a datacenter or cloud switch architecture, the devices included in the network switch system 100 may be implemented as, for example, distributed top-of-rack switches or fabric application-specific integrated circuits (ASICs). Additionally or alternatively, the devices included in the network switch system 100 may be implemented as any network switch device that includes one or more physical ports.

Each of the ingress devices 102, 103, and 104 includes a port P1, P2, and P3, respectively. Though the ingress devices 102, 103, and 104 are shown with a single port, the ingress devices 102, 103, and 104 may include multiple ports. Egress device 115 includes ports P4/1, P4/2, P4/3, and P4/4. Egress device 116 includes ports P5/1, P5/2, P5/3, and P5/4. The ports included in egress devices 115 and 116 are shown as being aggregated under a link aggregation scheme into link aggregation groups (LAGs) PO-1, PO-2, and PO-3.

Specifically, LAG PO-1 includes ports P4/1, P4/2, and P4/3 of egress device 115. LAG PO-2 includes port P4/4 of egress device 115 and port P5/1 of egress device 116. LAG PO-3 includes ports P5/2, P5/3, and P5/4 of egress device 116. As described above, each of LAGs PO-1, PO-2, and PO-3 represents a single communication channel associated with a single logical address (e.g., a single MAC address and/or a single IP address, depending on the network layer at which the link aggregation scheme operates). Thus, each of the ports included in a LAG are connected to a single computing device or logical destination, such that a data unit addressed to the computing device or logical destination may be sent through any one of the ports included in the LAG.

The egress devices 115 and 116 may include more or fewer ports and these ports may be grouped into more or fewer LAGs, depending on the link aggregation scheme. Moreover, ingress devices 102, 103, and 104 and egress devices 115 and 116 are discussed as ingress and egress devices for ease of explanation. Ingress devices 102, 103, and 104 and egress devices 115 and 116 may serve as both ingress and egress devices. Accordingly, though only the ports included in the egress devices 115 and 116 are shown as being grouped into LAGs, the ports included in ingress devices 102, 103, and 104 may also be grouped into LAGs when ingress devices 102, 103, and 104 act as egress devices. Thus, the processes of conversational port resolution that will be described below may be applied in the opposite direction, where ingress devices 102, 103, and 104 act as egress devices and ports P1, P2, and P3 are aggregated into LAGs.

Control plane 105 implements the link aggregation scheme. For example, when the link aggregation scheme is an EtherChannel scheme, the control plane 105 is configured to create and maintain a LAG table that includes conversational information for resolving which port of an egress device included in a given LAG should be used to send a data unit received by an ingress device. The control plane 105 may organize the LAG table in different logical formats or data structures. For example, the control plane 105 may organize the LAG table as a database that takes the form of table 130. The control plane 105 then may distribute all or a portion of the LAG table to one or more of the ingress devices included in the network switch system 100 such that the one or more ingress devices can resolve LAG ports based on the LAG table.

When the link aggregation scheme is an EtherChannel scheme, the control plane 105 may be configured to develop a LAG table that maps an incoming data unit to a specific port of an egress device according to a mapping function. In an EtherChannel scheme, the mapping function may include a flow hash function that converts information included in the received data unit into an integer. In some implementations, for example, the flow hash function may convert information included in the frame header of a received data unit and information about the payload of the received data unit into an integer between zero and seven. The LAG table may correspondingly include conversational information that maps the integer output of the flow hash function to a port of an egress device included in a LAG.

For example, as shown in the table 130, each of the physical ports included in LAG PO-1 (i.e., P4/1, P4/2, and P4/3) are associated with one or more outputs of the flow hash function. Thus, when an ingress device included in the network switch system 100 receives a data unit that needs to be sent to a computing device attached to LAG PO-1, the ingress device may extract information from the received data unit and perform a flow hash function based on the extracted information. The output of the flow hash function may be, for example, an integer between zero and seven. Based on an identification of the LAG to which the received data unit should passed and the output of the flow hash function, the ingress device may use the table 130 prepared by the control plane 105 to determine to which port included in the identified LAG the received data unit should be passed.

For example, as shown in table 130, when the LAG is PO-1 and the flow hash function returns an output of zero, one, or two, the table 130 indicates that the ingress device should pass the received data unit to port P4/1 of egress device 115 via fabric 110. Similarly, when the LAG is PO-2 and the flow hash function returns an output of one, three, five, or seven, the table 130 indicates that the ingress device should pass the received data unit to port P5/1 of egress device 116 via fabric 110.

In some implementations, the control plane 105 may be configured to provide a complete or master LAG table with all associated conversational information for port resolution to each of the ingress devices included in the network switch system 100 (i.e., ingress devices 102, 103, and 104). For example, where the table 130 represents the entire LAG table with all associated conversational information for port resolution, the control plane 105 may be configured to provide a copy of the table 130 to each of ingress devices 102, 103, and 104.

However, the LAG table may need to be updated for various reasons. For example, when a port included in one of the egress devices fails, the control plane 105 may be configured to update the table 130 to avoid use of the failed port. In configurations where the control plane 105 provides the entire LAG table with all associated conversational information for port resolution to each of the ingress devices, the control plane 105 must send updates to the LAG table to all of the ingress devices. When this configuration of the control plane 105 is scaled to a large network switch system that includes hundreds of ingress and egress devices with tens of thousands of ports, updating the LAG table in all of the ingress devices may require a prohibitively large amount of resources.

To avoid the need to provide all ingress devices with all updates to the LAG table, the control plane 105 may employ a conversational port resolution process, an example of which is described below with regard to FIG. 2. Generally speaking, a conversational port resolution process provides only relevant portions of the LAG table to each ingress device and only requires that relevant updates be forwarded to each ingress device. By limiting the number of ingress devices to which updates need to be sent, a conversational port resolution process makes implementation of a link aggregation scheme more feasible for large network switch systems.

Figure 2:
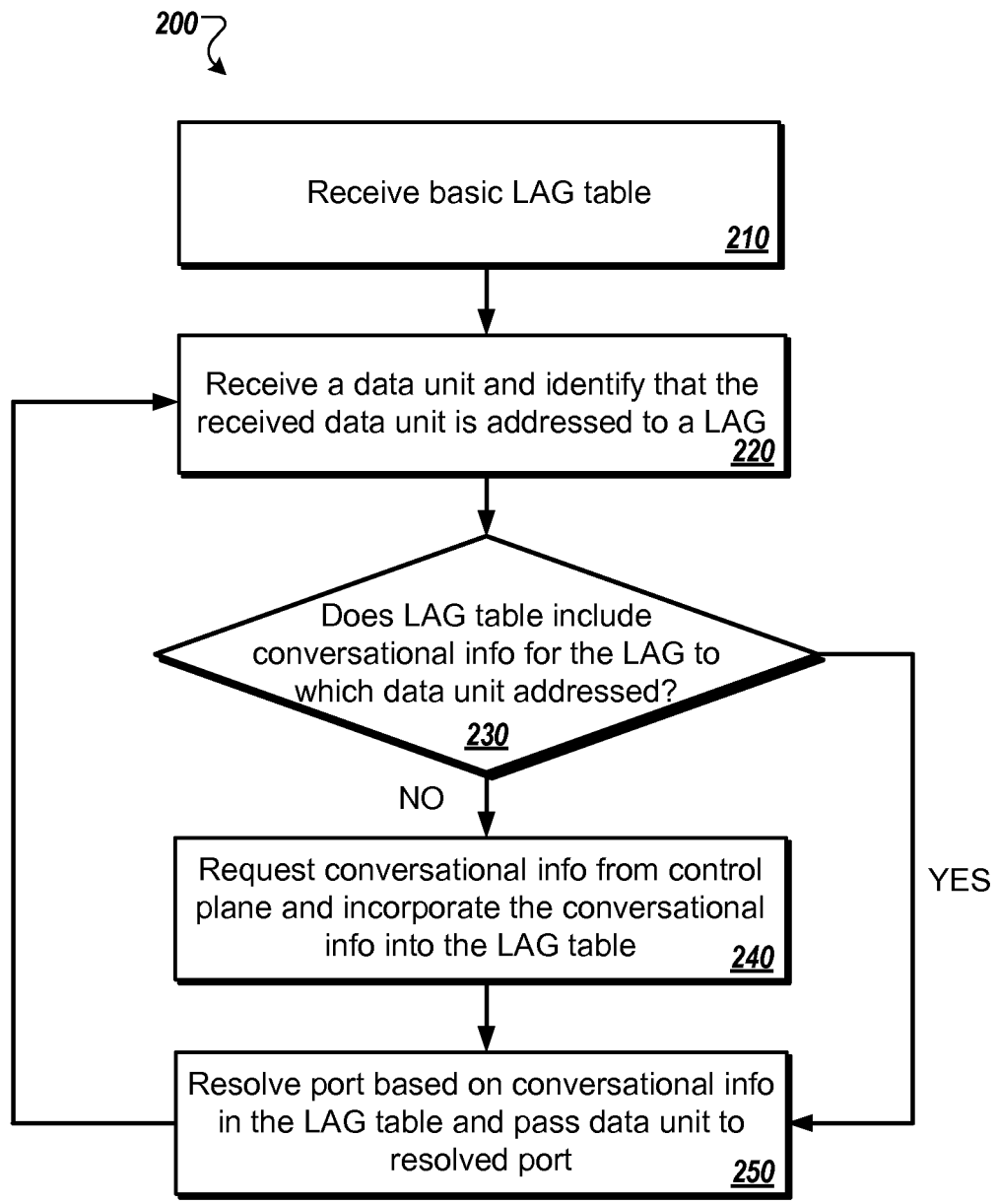
FIG. 2 is a flow chart illustrating an example process for conversational resolution in a network switch system employing link aggregation.

FIG. 2 is a flow chart illustrating an example process 200 for conversational resolution in a network switch system employing link aggregation. For clarity of presentation, the description that follows generally describes the process 200 in the context of the network switch system 100 of FIG. 1. However, it will be understood that process 200 may be performed, for example, by any other suitable system, environment, software, hardware, or a combination of systems, environments, software, and hardware as appropriate.

At 210, ingress devices 102, 103, and 104 each receive a basic LAG table from the control plane 105. The basic LAG table includes a default port for each LAG that is designated for exit traffic. For example, with reference to FIG. 1, ingress device 102 may receive a basic LAG table that includes one entry for each of LAGs PO-1, PO-2, and PO-3, where each entry maps all outputs of the flow hash function to a single port. The basic LAG table may, for example, specify that all communications intended for LAG PO-2 should be forwarded to port P4/4 of egress device 115. In some implementations, the control plane 105 may prepare a basic LAG table particular to each ingress device, such that not all ingress devices are directed by the LAG table to pass received data units to the same port.

At 220, an ingress device receives a data unit and identifies that the data unit is addressed to a LAG. Not all egress devices with which the ingress device communicates may employ link aggregation, so the process of conversational port resolution may only be relevant to those egress devices employing a link aggregation scheme. Where the data unit is addressed to a LAG, the basic LAG table received at 210 includes information that identifies a default port included in the LAG to which the received data unit was addressed. However, in order to take advantage of the benefits of link aggregation, the LAG table may be updated to include conversational information about individual LAGs.

At 230, the ingress device determines whether its LAG table includes conversational information about the LAG to which the received data unit is addressed. Conversational information about a LAG provides a full mapping of flow hash function outputs to ports included in the LAG. If the ingress device does not have conversational information about the LAG to which the received data unit is addressed, at 240, the ingress device requests conversational information about the LAG from control plane 105 and incorporates the received conversational information into the ingress device's LAG table.

When an ingress device requests conversational information for a LAG, the control plane 105 retrieves the conversational information and forwards the conversational information to the ingress device. In some implementations, the control plane 105 may maintain a master LAG table that includes all information necessary to implement the link aggregation scheme including the conversational information for all of the LAGs included in the network switch system 100. When the control plane 105 receives a request for conversational information, the control plane 105 may retrieve the conversational information from the master LAG table.

In some implementations, when the control plane 105 receives a request for conversational information, the control plane 105 also updates a communication channel table with an indication that a two-way communication link has been created between the ingress device and the LAG. The communication channel table may list all active two-way communication links between ingress devices and LAGs included in the network switch system 100. The control plane 105 may use the communication channel table to identify to which ingress devices updates to conversational information should be sent. For example, if port P4/1 included in LAG PO-1 fails, the control plane 105 may update the conversational information associated with LAG PO-1 to avoid use of port P4/1. The control plane 105 may further use the communication channel table to identify those ingress devices that have initiated two-way communications with and received conversational information about LAG PO-1. The process of updating the lists of LAGs of ingress devices will be described in greater detail with regard to FIG. 4.

Once the LAG table included in the ingress device includes the conversational information for the LAG to which the received data unit was addressed, at 250, the ingress device resolves the specific port of the LAG to which the received data unit should be passed. When the link aggregation scheme employed by the network switch system 100 is an EtherChannel scheme, the ingress device may resolve the specific port by performing a flow hash function and locating the proper port in the conversational information of LAG table based on the output of the flow hash function. In come implementations, the ingress device may extract information from the received data unit (e.g., frame header and payload information) and use the extract information as input to the flow hash function. Based on an identification of the LAG to which the received data unit is addressed and the output of the flow hash function, the ingress device may determine a port within the LAG to which the data unit should be passed via fabric 110.

After resolving the proper port, the ingress device passes the received data unit to the proper port. The process 200 returns to operation 220, where the ingress device waits to receive another data unit into the network switch system 100. In some implementations, the ingress device may be configured to pass a received data unit to the default port indicated in the basic LAG table for the addressed LAG before requesting the conversational information from the control plane 105. By passing the received data unit to the default port, the ingress device avoids delaying the transmission of the received data unit to the intended recipient. After receiving the conversational information for the LAG, the ingress device may use the conversational information to resolve the proper port for all future data units addressed to the LAG.

In some implementations, the network switch system 100 may be configured to age the conversations between ingress devices and LAGs. In some implementation, for example, once an aging condition is met (e.g., no communications are made over a period of time between an ingress device and a LAG that have previously established a two-way conversation), the network switch system 100 may be configured to remove the conversational information about the LAG from the ingress device's LAG table and remove the communication channel from the control panel's communication channel table. By aging conversations, the network switch system 100 can ensure that updates to the LAG tables are sent to only those ingress devices maintaining active conversations relevant to the update.

The aging process implemented by the network switch system 100 may be implemented in hardware or software. In implementations where the aging process is implemented in hardware, an ingress device may include hardware that determines the age of conversational information included in the ingress device's LAG table based on a configurable aging period. Once the ingress device hardware determines that the aging period of conversational information associated with inactive conversations has expired, the ingress device hardware may be configured to remove the expired conversational information from the LAG table and send a signal to the control plane 105 that causes the control plane 105 to remove the communication channel from the communication channel table.

In implementations where the aging process is implemented in software, the control plane 105 may be configured to determine the age of the communication channels included in the communication channel table based on a configurable aging period. Once the control plane 105 determines that the aging period of an inactive communication channel has expired, the control plane 105 may be configured to remove the communication channel from the communication channel table and notify the ingress device associated with the communication channel to delete the conversational information associated with the LAG of the conversation.

In either the hardware or software implementations, the aging process may be modified to take into account special situations. In some implementations, for example, the aging process may be disabled for the conversational information associated with certain types of LAGs (e.g., a LAG associated with an uplink to an internet gateway). In another example, the configurable aging period of the aging process may be set to correspond to a MAC aging process implemented by the network switch system 100.

Figure 3A:
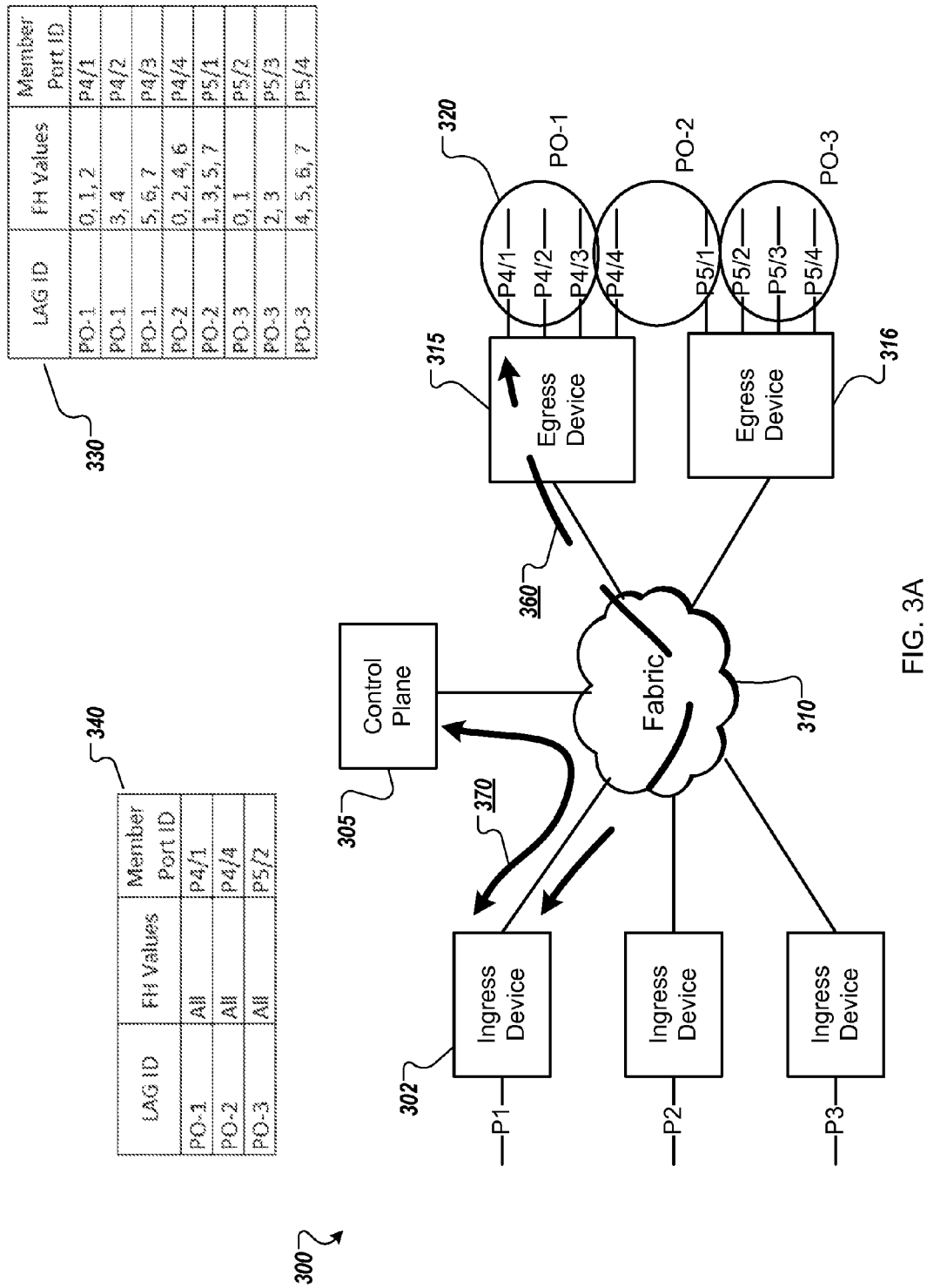
FIGS. 3A and 3B are diagrams of a network switch system illustrating a process for conversational resolution.
Figure 3B:
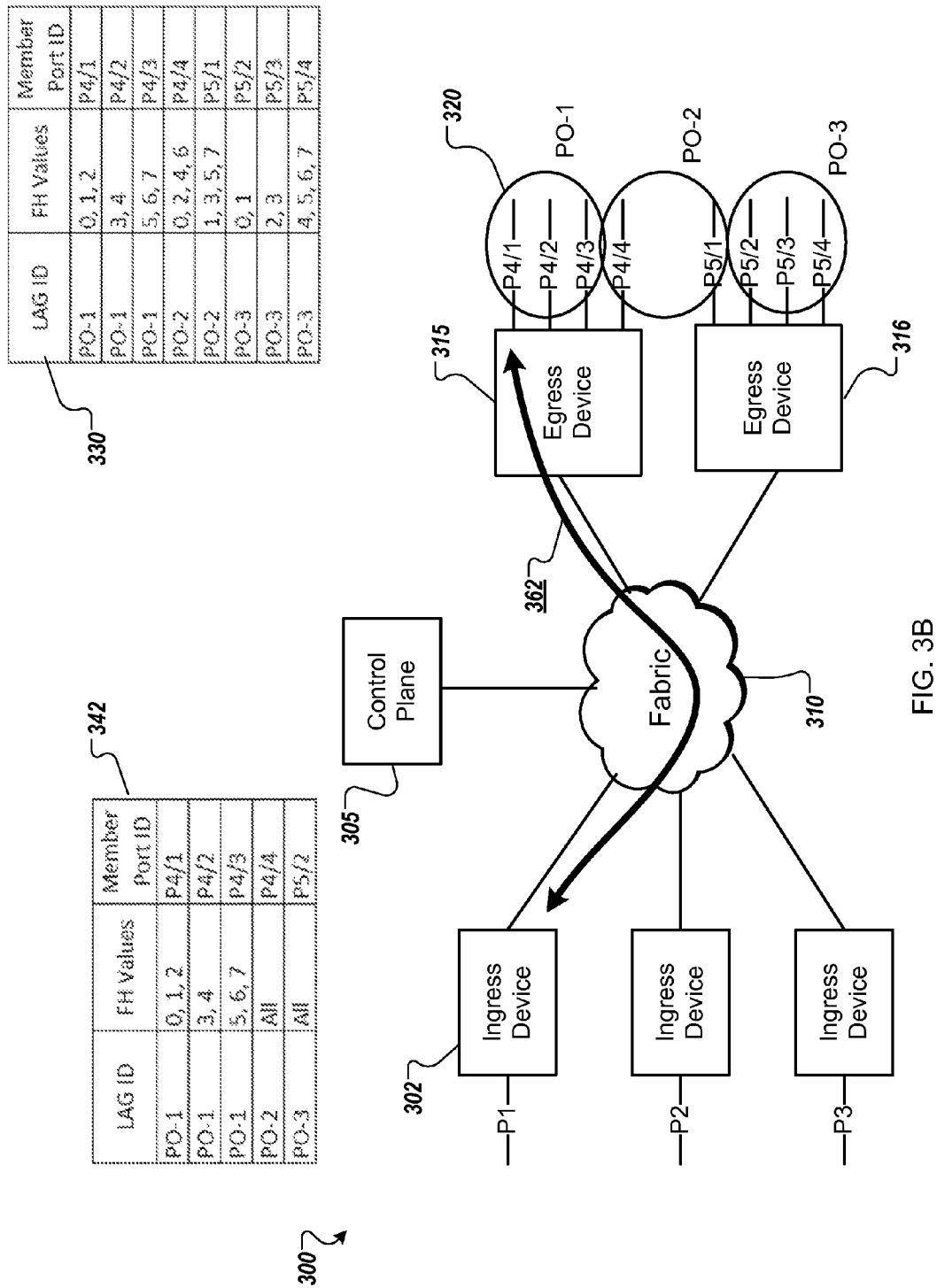

FIGS. 3A and 3B are diagrams of a network switch system illustrating an example of process 200 for conversational port resolution. Specifically, FIGS. 3A and 3B illustrate a network switch system 300 that includes ingress device 302, control plane 305, fabric 310, and egress devices 315 and 316. Egress device 315 includes ports P4/1, P4/2, P4/3, and P4/4. Egress device 316 includes ports P5/1, P5/2, P5/3, and P5/4. The ports included in egress devices 315 and 316 are shown as being aggregated under a link aggregation scheme into link aggregation groups (LAGs) PO-1, PO-2, and PO-3.

In FIG. 3A, basic LAG table 340 includes information about a single predetermined port for each LAG PO-1, PO-2, and PO-3 to which exit traffic should be passed by default. The ingress device 302 stores the basic LAG table 340 as a result of, for example, operation 210 of process 200. When ingress device 301 receives a data unit at port P1, the ingress device 302 may determine that the received data unit is addressed to LAG PO-1 and should be passed to LAG PO-1 via fabric 310, as illustrated by the communication path 360. However, ingress device 302 must determine the particular port of LAG PO-1 to which the received data unit should be passed.

When ingress device 302 queries the basic LAG table 340, the ingress device 302 determines that the basic LAG table 340 does not include conversational information about LAG PO-1, the LAG to which the received data unit is addressed. Therefore, ingress device 302 sends a request through channel 370 to the control plane 305 for the conversational information associated with LAG PO-1. The control plane 305 may access a master LAG table 330 that includes the conversational information for all of the LAGs included in the network switch system 300 and extract the conversational information for LAG PO-1. The control plane 305 may then provide the conversational information for LAG PO-1 to ingress device 302 through channel 370.

As shown in FIG. 3B, the ingress device 302 may incorporate the received conversational information into basic LAG table 340, which results in LAG table 342. In LAG table 342, ingress device 302 has replaced the default port information for LAG PO-1 with the received conversational information, but has maintained the default port information for LAGs PO-2 and PO-3. However, ingress device 302 may incorporate the received conversational information by any suitable manner.

In order to resolve the proper port of LAG PO-1 to which the received data unit should be sent, the ingress device 302 may perform a mapping function (e.g., a flow hash function). Based on the output of the mapping function and the conversational information contained in LAG table 342, the ingress device 302 may determine the proper port. For example, with reference to the conversational information included in LAG table 342, if the received data unit is addressed to LAG PO-1 and the mapping function returns an integer of three or four, the ingress device 302 determines that the received data unit should be forwarded to egress device 315 via channel 362 and sent through port P4/2.

If the ingress device 302 receives another data unit addressed to LAG PO-1, the ingress device 302 may determine that LAG table 342 already includes conversational information for LAG PO-1. Therefore, the ingress device 302 may be configured to rely upon the information included in LAG table 342 to resolve the proper port without sending a request to control plane 305. By first checking if the LAG table 342 already includes conversational information, the ingress device 302 may reduce the number of requests sent to the control plane 305 and thereby increase the efficiency of the network switch system 300.

Figure 4:
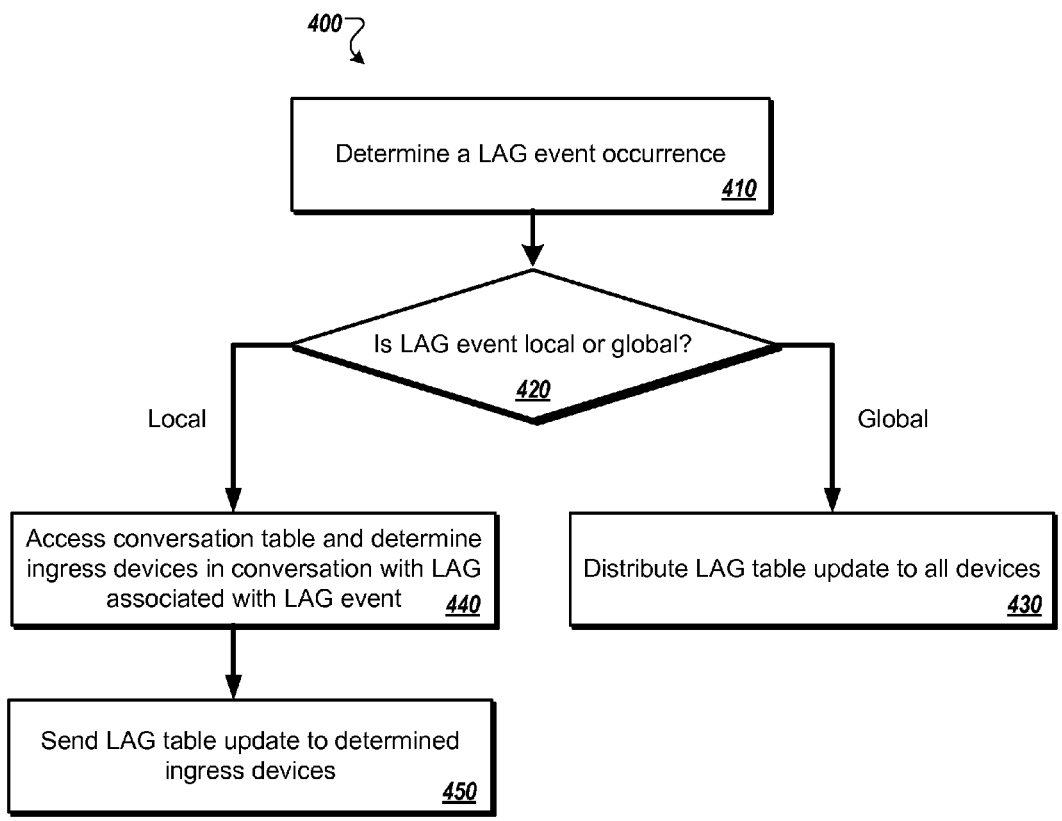
FIG. 4 is a flow chart illustrating an example process for handling event updates in a network switch system employing conversational resolution.

FIG. 4 is a flow chart illustrating an example process 400 for handling event updates in a network switch system employing conversational port resolution. For clarity of presentation, the description that follows generally describes the process 400 in the context of the network switch system 100 of FIG. 1. However, it will be understood that process 400 may be performed, for example, by any other suitable system, environment, software, hardware, or a combination of systems, environments, software, and hardware as appropriate.

As described above, the control plane 105 may need to update LAG tables included in the ingress device 102, 103, and 104 for various reasons. For example, when a port included in one of the egress devices fails, the control plane 105 may be configured to update the LAG tables to avoid use of the failed port. To facilitate these updates the control plane 105 may include a communication channel table that lists all active two-way communication links between ingress devices and LAGs included in the network switch system 100.

With reference to process 400, the control plane 105 may determine, at 410, that an event has occurred with regard to a LAG that requires a LAG table update. These LAG events may include, for example, the addition/link-up of a port to a LAG, the removal/link-down of a port from a LAG, or a change in mapping of ports due to dynamic load balancing. Each of the LAG events may be global or local, depending on the impact of the LAG event on the LAG tables. For example, the addition/link-up of a port to a LAG will not affect the default port information included in a basic LAG table, but will affect the conversational information for the LAG. Therefore, the addition/link-up of a port to a LAG may be considered a local LAG event because it only affects those LAG tables that include conversational information for the LAG. On the other hand, for example, the removal/link-down of a port from a LAG may affect the default port information included in a basic LAG table, and therefore may be considered a global LAG event.

Thus, at 420, the control plane 105 determines whether the LAG is a local event or a global event. If the LAG event is a global event, at 430, the control plane 105 simply distributes the resulting LAG table update to all of the ingress devices included in the network switch system 100. On the other hand, if the LAG event is a local event, at 440, the control plane 105 accesses the communication channel table and determines all of the ingress devices listed in the communication channel table as being a part of conversations including the LAG associated with the LAG event.

At 450, the control plane 105 sends the resulting LAG table update to those ingress devices determined to be in conversation with the LAG associated with the LAG event. For example, a local LAG event may be associated with LAG PO-1 and the communication channel table may indicate that only ingress device 102 is in a conversation with LAG PO-1. As a result, control plane 105 may send the resulting LAG table update to only ingress device 102 and not ingress device 103 and 104. By only sending the LAG table updates resulting from local LAG events to ingress devices in conversation with the corresponding LAG, the control plane 105 reduces the number of LAG table updates that need to be sent across the network switch system 100. For large network switch systems, this reduction of LAG table updates may increase the efficiency and operability of a link aggregation scheme.

The disclosed and other examples can be implemented as one or more computer program products, that is, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data can include all forms of nonvolatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   receiving a list of logic link aggregations (LAGs) within a computer network, the list identifying a single physical egress port associated with each LAG;
   receiving a first data unit;
   identifying that the first data unit is addressed to a remote LAG included in the list of logic link aggregations;
   establishing a connection with the remote LAG;
   downloading a detailed data describing the remote LAG from a control plane, the detailed data including a list of multiple available physical egress ports associated with the remote LAG, and;
   upon downloading the detailed data, incorporating the detailed data into the list of LAGs in association with an entry identifying the remote LAG.

2. The method of claim 1, further comprising communicating the first data unit to the single egress port associated with the remote LAG based on the list of LAGs.

3. The method of claim 2, wherein communicating the first data unit to the single egress port is performed prior to downloading.

4. The method of claim 1, wherein the establishing and the downloading are performed asynchronously.

5. The method of claim 1, further comprising:
   receiving a second data unit addressed to the remote LAG;
   recognizing that the list of LAGs includes detailed data associated with the remote LAG; and
   communicating the second data unit to one of the multiple available physical egress ports included in the detailed data associated with the remote LAG,
   wherein the establishing and downloading steps are not performed.

6. The method of claim 1, wherein the detailed data includes hash values indicating which of the physical egress ports on a LAG to transmit the first data unit.

7. The method of claim 6, further comprising:
   receiving a second data unit addressed to the remote LAG;
   recognizing that the list of LAGs includes detailed data associated with the remote LAG; and
   communicating the second data unit to one of the multiple available physical egress ports included in the detailed data associated with the remote LAG based on at least one of the hash values,
   wherein the establishing and downloading steps are not performed.

8. The method of claim 1, further comprising incorporating the detailed data into a copy of the list of LAGs in association with an entry identifying the remote LAG, the copy stored by the control plane.

9. A network switch system, comprising:
   one or more processors; and
   logic encoded in one or more tangible non-transitory machine-readable media for execution on the one or more processors, and when executed operable to:

receive a list of logic link aggregations (LAGs) within a computer network, the list identifying a single physical egress port associated with each LAG;
receive a first data unit;
identify that the first data unit is addressed to a remote LAG included in the list of logic link aggregations;
establish a connection with the remote LAG;
download a detailed data describing the remote LAG from a control plane, the detailed data including a list of multiple available physical egress ports associated with the remote LAG, and;
upon downloading the detailed data, incorporate the detailed data into the list of LAGs in association with an entry identifying the remote LAG.

10. The network switch system of claim 9, wherein the one or more processors are further operable to:
communicate, prior to downloading, the first data unit to the single egress port associated with the remote LAG based on the list of LAGs.

11. The network switch system of claim 9, wherein the one or more processors are further operable to establish and download asynchronously.

12. The network switch system of claim 9, wherein the one or more processors are further operable to:
receive a second data unit addressed to the remote LAG;
recognize that the list of LAGs includes detailed data associated with the remote LAG; and
communicate the second data unit to one of the multiple available physical egress ports included in the detailed data associated with the remote LAG,
wherein the establishing and downloading steps are not performed.

13. The network switch system of claim 9, wherein the detailed data includes hash values indicating which of the physical egress ports on a LAG to transmit the first data unit.

14. The network switch system of claim 13, wherein the one or more processors are further operable to:
receive a second data unit addressed to the remote LAG;
recognize that the list of LAGs includes detailed data associated with the remote LAG; and
communicate the second data unit to one of the multiple available physical egress ports included in the detailed data associated with the remote LAG based on at least one of the hash values,
wherein the establishing and downloading steps are not performed.

15. A non-transitory computer-readable medium comprising instructions to cause a processor to perform operations comprising:
receiving a list of logic link aggregations (LAGs) within a computer network, the list identifying a single physical egress port associated with each LAG;
receiving a first data unit;
identifying that the first data unit is addressed to a remote LAG included in the list of logic link aggregations;
establishing a connection with the remote LAG;
downloading a detailed data describing the remote LAG from a control plane, the detailed data including a list of multiple available physical egress ports associated with the remote LAG, and;
upon downloading the detailed data, incorporating the detailed data into the list of LAGs in association with an entry identifying the remote LAG.

16. The non-transitory computer-readable medium of claim 15, wherein the operations further comprise: communicating, prior to the downloading, the first data unit to the single egress port associated with the remote LAG based on the list of LAGs.

17. The non-transitory computer-readable medium of claim 16, wherein the one or more processors are further operable to establish and download asynchronously.

18. The non-transitory computer-readable medium of claim 15, wherein the operations further comprise:
receiving a second data unit addressed to the remote LAG;
recognizing that the list of LAGs includes detailed data associated with the remote LAG; and
communicating the second data unit to one of the multiple available physical egress ports included in the detailed data associated with the remote LAG,
wherein the establishing and downloading steps are not performed.

19. The non-transitory computer-readable medium of claim 15,
wherein the detailed data includes hash values indicating which of the physical egress ports on a LAG to transmit the first data unit,
wherein the operations further comprise:
receiving a second data unit addressed to the remote LAG;
recognizing that the list of LAGs includes detailed data associated with the remote LAG; and
communicating the second data unit to one of the multiple available physical egress ports included in the detailed data associated with the remote LAG based on at least one of the hash values, and
wherein the establishing and downloading steps are not performed.

20. The non-transitory computer-readable medium of claim 15, wherein the operations further comprise:
incorporating the detailed data into a copy of the list of LAGs in association with an entry identifying the remote LAG, wherein the copy is being stored by the control plane.

* * * * *